United States Patent [19]
Pallat

[11] Patent Number: 5,541,676
[45] Date of Patent: Jul. 30, 1996

[54] ADJUSTABLE HEADBAND ATTACHMENT FOR EYEGLASSES

[76] Inventor: Joseph A. Pallat, 1351 Lexington Rd., Concord, Calif. 94520

[21] Appl. No.: 341,504

[22] Filed: Nov. 17, 1994

[51] Int. Cl.⁶ .................................................. G02C 3/00
[52] U.S. Cl. ............................ 351/156; 351/157; 24/3.3
[58] Field of Search ................................ 351/156, 157, 351/158, 41, 142, 114, 117, 111, 153, 122, 123, 121; 2/452; 24/3.3

[56] References Cited

U.S. PATENT DOCUMENTS

| | | | |
|---|---|---|---|
| 2,660,092 | 11/1953 | Bloom | 88/51 |
| 3,791,721 | 2/1974 | Helfrich | 351/44 |
| 4,129,362 | 12/1978 | Lorenzo | 351/123 |
| 4,471,509 | 9/1984 | Marks | 351/156 |
| 4,881,803 | 11/1989 | Giles et al. | 351/156 |
| 4,953,967 | 9/1990 | Somerville | 351/163 |
| 5,054,903 | 10/1991 | Jannard et al. | 351/123 |

Primary Examiner—William L. Sikes
Assistant Examiner—Hung Xuan Dang
Attorney, Agent, or Firm—George W. Wasson

[57] ABSTRACT

An adjustable attachment for eyeglasses in the form of a flexible headband attachment that can be attached to the existing portions of a pair of eyeglasses and looped around the head of the eyeglasses user. The flexible headband includes a clamp for adjusting the length of the headband to fit the headband tight around the head of the eyeglasses user and includes a stop for securing the headband in it adjusted length. The flexible headband attachment includes straps that pass through a movable sheathing between the eyeglasses frame and the clamp.

18 Claims, 2 Drawing Sheets

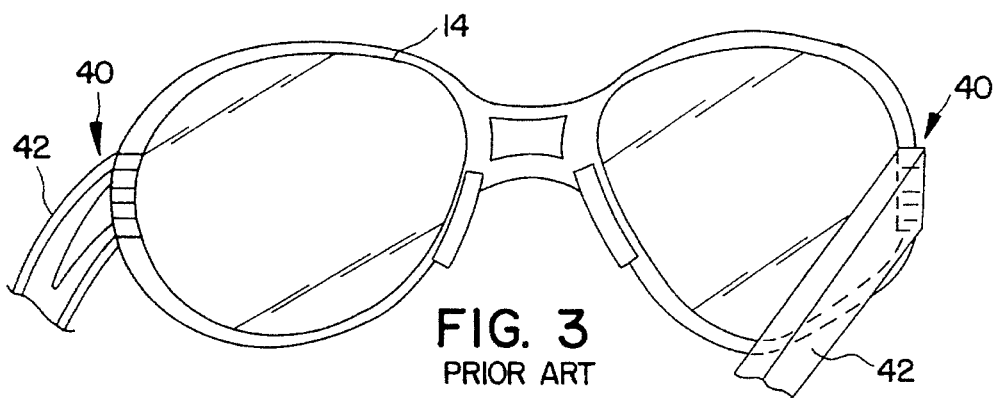
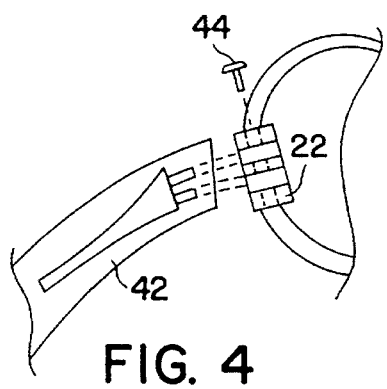
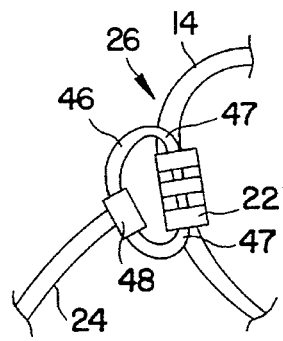
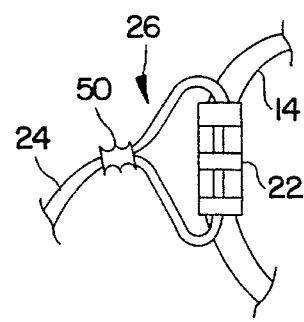
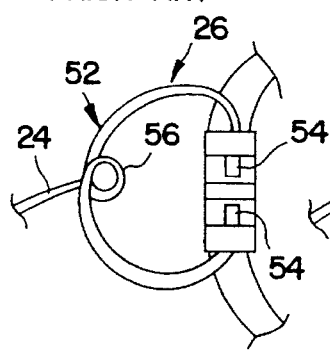
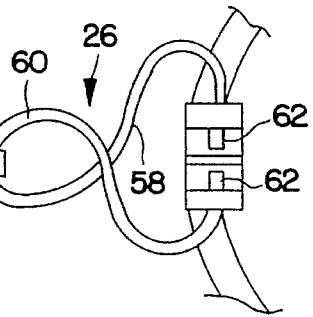
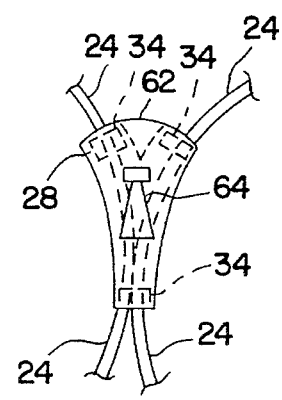
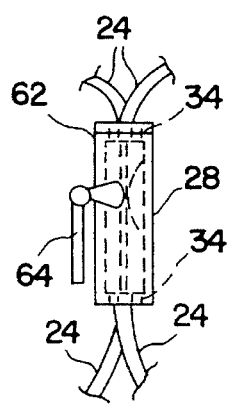
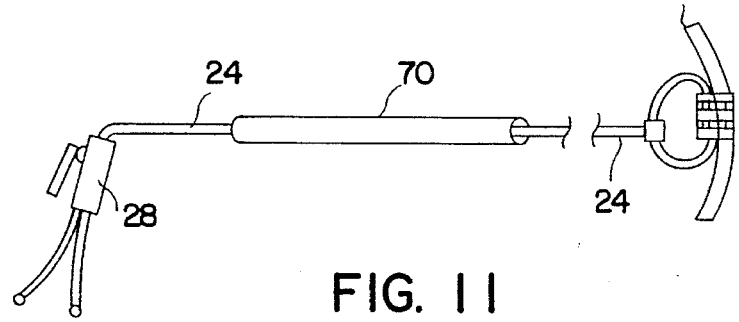

ADJUSTABLE HEADBAND ATTACHMENT FOR EYEGLASSES

This invention relates to an adjustable attachment for eyeglasses and more particularly to a flexible headband attachment that can be attached to the existing portions of a pair of eyeglasses and looped around the head of the eyeglass user. The flexible headband includes means for adjusting the length of the headband to fit the headband tight around the head of the eyeglass user and includes a means for securing the headband in it adjusted length.

BACKGROUND OF THE INVENTION

The normal means for holding eyeglasses on the head of the eyeglass user is to attach temple/ear pieces to each side of the eyeglass frame and to loop those temple/ear pieces around the ears of the user. When properly adjusted for length the ear pieces hold the framed glasses in place and keep a nose support in position to engage the bridge of the nose of the user. When the user of the eyeglasses is inactive the glasses usually remain in place; however, if the glasses ear pieces are not properly adjusted and if the user is active or leaning forward, frequently the eyeglasses slide off the nose of the user and can fall off the head of the user. It is known to provide a strap attached to the ends of the ear pieces and to loop that strap around the neck of the user to prevent the glasses from falling completely off the user. That form of strap is not intended to be tightened about the head of the user to hold the eyeglasses in place. The present invention is intended to provide a means for comfortably holding eyeglasses in place on the head of the user regardless of how active the user is or of the position of the user's head.

The prior art of this invention includes U.S. Pat. No. 2,660,092 issued Nov. 24, 1953 to I. E. Bloom for Eyeglass Attachment and U.S. Pat. No. 4,953,967 issued Sep. 4, 1990 to W. D. Somerville for Naison-secured Sport Glasses. The Bloom patent discloses an eyeglass attachment that requires the eyeglass frames to be constructed specifically for the attachment. The attachment is a flexible band that encircles the head of the user and a fastening device is used to hold the attachment is an adjusted length. The Somerville patent is directed to an attachment for eyeglasses including a band for encircling the head of the user and specifically designed nose pieces that are used with the eyeglass frame to hold the glasses comfortably against the nose of the user. Both of these patents require special construction of the eyeglass frames to permit the inventions to be used.

SUMMARY OF THE INVENTION

The present invention is adapted to be used with existing eyeglass frames without modification. Most eyeglasses that have temple/ear pieces attach those pieces by a hinge assembly. The hinge assembly includes parts that are attached to the eyeglass frame and parts that are attached to the temple/ear pieces. A small screw passes through those parts to secure the pieces to the frame in a manner to allow the pieces to be moved with respect to the frame about the axis of the hinge. The present invention is adapted to cooperate with the part of that assembly that is on the eyeglass frame when the ear pieces have been removed from the frame.

An object of the present invention is to provide an adjustable headband that may be attached to existing eyeglass frames to permit the use of the glasses in activites that might normally cause the glasses to fall off the head of the user.

A further object of the present invention in accord with the preceeding object is to provide an attachment for eyeglasses that can be attached to the eyeglasses without modification of the eyeglass frames.

Another object of the invention in accord with the preceeding objects is to provide an adjustable attachment for eyeglasses that will permit the eyeglasses to be adjusted to fit the head of any user and to hold the glasses in place after the attachment has been adjusted.

Further objects and features of the present invention will be readily apparent to those skilled in the art from the appended drawings and specification illustrating a preferred embodiment wherein:

BRIEF DESCRIPTION OF THE DRAWINGS

FIG. 3 is a front elevational view, partially in perspective, showing a conventional attachment of temple/ear pieces to an eyeglass frame.

FIG. 4 is a view showing the temple/ear pieces removed from a conventional hinge of an eyeglass frame.

FIGS. 5, 6, 7 and 8 are illustrations of alternative means for securing the adjustable headband attachment of the present invention to the conventional hinge of an eyeglass frame.

FIG. 9 is an elevational view of the clamp of the present invention.

FIG. 10 is a side view of the clamp of FIG. 9 partially in section.

FIG. 11 is a side elevation view illustrating the addition of sheathing around the headband strap.

DESCRIPTION OF PREFERRED EMBODIMENTS

Figure 1:
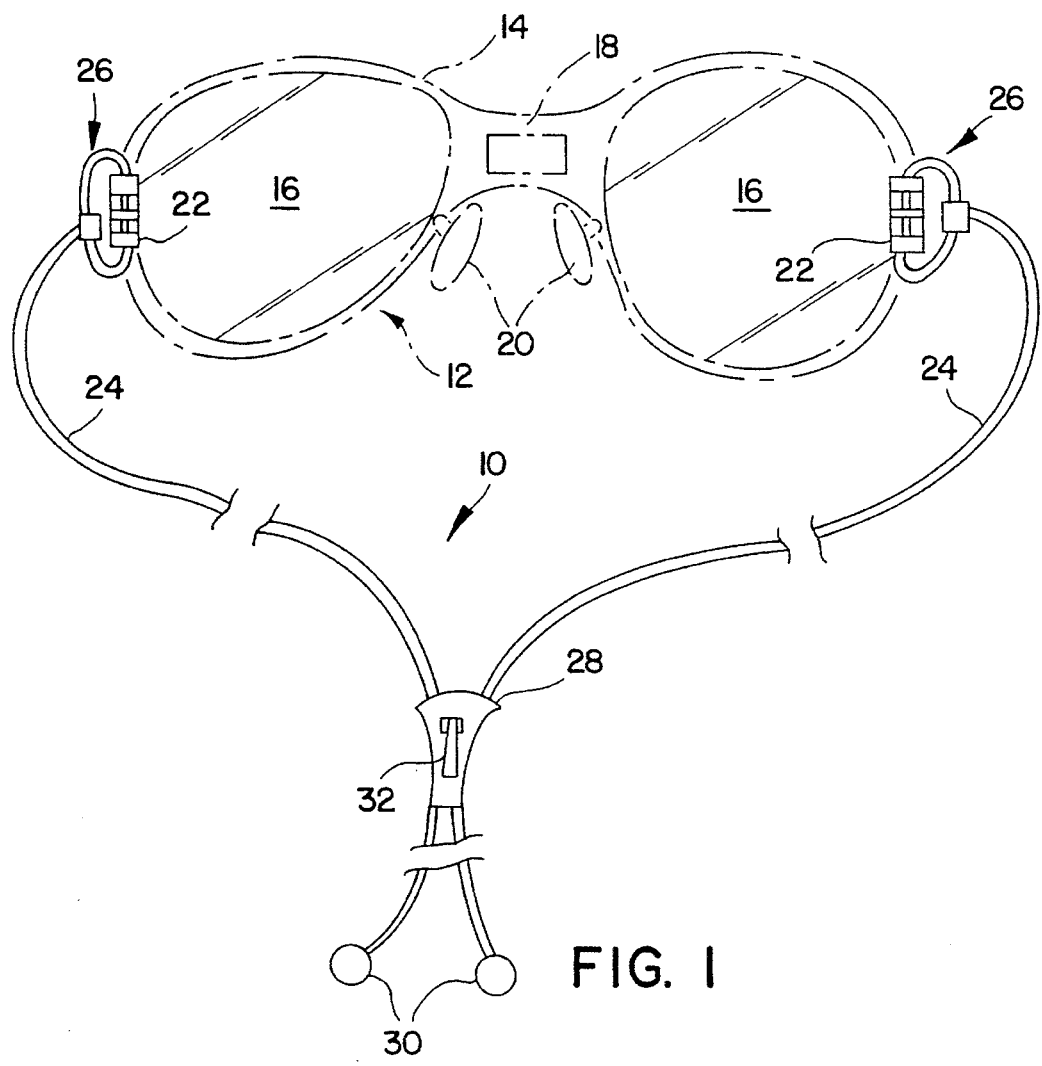
FIG. 1 is an illustration of the adjustable headband attachment of the present invention attached to a conventional eyeglass frame.

As illustrated in FIG. 1, the present invention is an adjustable headband attachment 10 that is adapted to be attached to a conventional eyeglass 12. The eyeglass 12 includes a frame 14 that encircles and holds the lenses 16 of the glasses and usually includes some form of central bridge means 18 that supports nose pads 20. A hinge member 22 is provided at each side of the frame 14 for the usual temple/ear pieces (not shown in this figure) that hold the glasses on the head of the user.

The adjustable headband attachment 10 of the present invention comprises a pair of flexible straps 24 attached by a movable connection at 26 to the hinge member 22 of the frame 14, a clamp 28 and stop means 30 at the end of the straps for preventing the straps from passing completely through the clamp 28. The clamp 28 includes an internal securing locking mechanism and an external operator 32 for securing the adjustable headband in an adjusted position.

Figure 2:
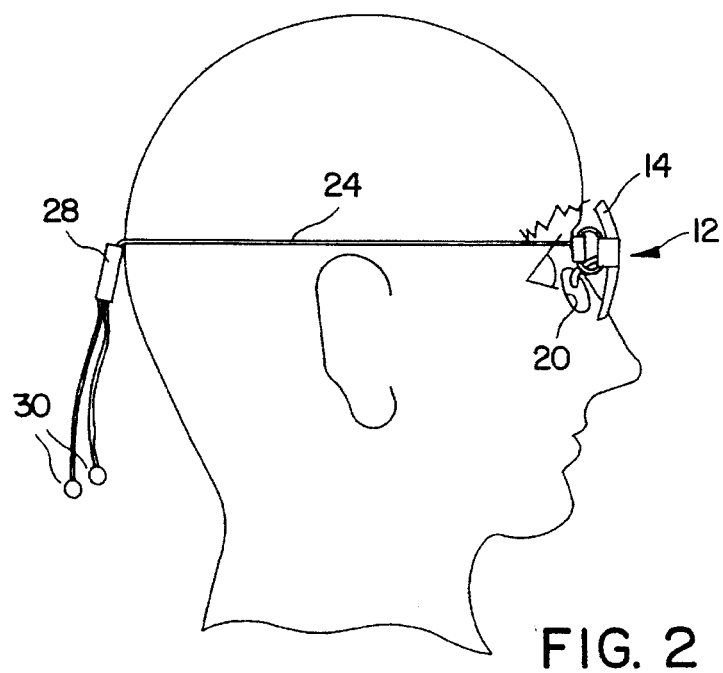
FIG. 2 is a side elevational view showing the present invention and eyeglasses in use on the head of a user.

FIG. 2 illustrates the adjustable headband attachment of the present invention in position on the head of a user. The strap 24 passes from the movable connection 26 at the frame 14 around the side of the user's head and to the back of the head where the clamp 28 holds the strap in its adjusted length and secures the frame 14 of the eyeglasses 12 against the face of the user.

FIG. 3, 4 and 5 illustrate the conversion of a conventional frame eyeglass for the adaptation of the present invention to that eyeglass frame. FIG. 3 illustrates an eyeglass frame 14 with a hinge assembly 40 at each side for the attachment of conventional temple/ear pieces 42. In FIG. 4 the ear pieces 42 are removed from the frame 14 by removing the pin 44 from the hinge member or loop 22 on the frame leaving a centrally open hinge member or loop 22 on the frame. FIG. 5 illustrates one form of movable connection 26 for a flexible strap 24 of the adjustable headband attachment 10. In the FIG. 5 form the movable connection comprises a solid loop portion 46 having fingers 47 passing through the opening in the hinge member 22 and a junction at 48 of that loop with the strap 24. The loop portion 46 assembled as an integral part of the strap 24 and may be continuous within the hinge member 22 or with fingers 47 ending within the hinge loop and is flexibly movable within the hinge to permit movement between the strap assembly and the frame. The loop 46 is made of material that is strong enough to maintain its integrety with the hinge member 22 when the strap 24 is tightened as the headband attachment is placed into position around the head of a user.

FIG. 6 illustrates the movable connection 26 formed by passing the flexible strap 24 through the hinge member 22 and then secured to itself as by soldering, welding, gluing or with a crimped connector at 50 to become an integral part of the strap.

FIG. 7 illustrates a movable connection 26 formed by the use of a spring member 52 having finger ends 54 passing through the hinge member 22 and a central loop 56 to produce a resilient bias for the ends 54. The strap 24 is attached to the spring member at the central loop 56 by suitable means to become an integral part of the strap.

FIG. 8 illustrates an alternative form of a spring member for the movable connection 26. In this form the spring member 58 includes a reversed looped portion providing a spring biased section that may be squeezed toward itself to open the ends 62 of the loop 58 for connection of the loop 58 to the hinge member 22.

FIG. 9 and 10 illustrate a form that the clamp 28 may take. In the form illustrated, the clamp includes an opening 62 at the top for accommodating the two portions of the strap 24 and an opening at the bottom for exit of the strap portions. A flexible gromet 34 may be provided at the top, at the bottom or at both ends of the clamp 28 to provide for guiding the straps 24 into and out of the clamp 28. The gromets 34 may also function as locking means for the straps 24 by providing a snug fit between the straps 24 and the gromets 34 within the clamp 28. The interior of the clamp is open to permit free and independent movement of the two strap portions. The locking stop means 30 for securing the strap in it adjusted length may take the form of a lever 64 at the exterior of the clamp for operating an interior wedge portion 66 that presses the strap portions 24 against the interior of the clamp 28 when the lever 64 is in its closed position. When the lever is in the open position the strap portions may be moved freely through the clamp 28. Other forms of apparatus for securing the strap in an adjusted length are contemplated.

As illustrated in FIG. 1 and 2, the flexible strap member 24 terminates at the end away from the frame in separate enlarged portions 30 that are sized to prevent that end of the strap portion from passing completely through the clamp 28. The adjustable headband attachment of the present invention will be formed with the straps 24 passing through the clamp 28 and with the stops 30 at one end and the movable connection 26 at the other end. When assembled, the attachment may be used with any conventional eyeglass frame having hinges by removing the temple/ear pieces from the frame leaving the open hinge member 22 and then attaching the flexible connection 26 to the open hinge member 22. In use the flexible straps 24 of the headband attachment 10 are placed around the head of a user and the straps 24 are slid through the clamp 28 until the frame is tightened against the head of the user. The stop means 30 of the clamp 28 is then closed to hold the assembly in place and to maintain the eyeglass frame against the face of the user as illustrated in FIG. 1.

The straps 24 may be of many forms, one form being a box link chain as is frequently used with jewelry necklaces. Such chains are substantially inextensible in their longitudinal direction while being flexible in their lateral direction. The straps 24 should be strong enough to permit the adjustable headband attachment to be tightened around the head of a user without damage to the straps while holding the eyeglasses securely against the face of the user. Other forms of straps, such as fabric or plastic straps, could be used with suitable means for attaching the straps to the hinge loops and the clamp and such alternative straps are contemplated in the present invention.

FIG. 11 illustrates the addition of an elongated, tubular sheathing 70 around the strap(s) 24. The sheathing 70 is added to provide comfort and protection to the user of the attachment of the present invention. If the straps 24 are small and tightened against the head of a user and over the ears of a user to a tightness that will hold eyeglasses to the face of the user, it is possible to irritate the skin or perhaps cut the skin at the ears or temples of the user. To overcome that possibility and to provide comfort in the use of the attachment, the straps 24 are passed through sheathing 70 between the clamp 28 and the means for movably attaching the straps 24 to the eyeglass frame 14. The sheathing 70 may be an elongated tubular piece, long enough to reach at least over the ears of a user and may extend from the clamp 28 toward the connecting means 26 a distance that will provide the desired protection and comfort. The sheathing 70 may be a flexible plastic that can be shrunken with the application of heat to cause the sheathing to become tightened around the straps 24. Preferrably, the shrunken sheathing 70 will remain slidable along the straps 24 to be positionable for comfort and protection. Other forms of sheathing that will provide the desired comfort and protection are contemplated for the attachment of the present invention.

The use of the adjustable headband attachment of the present invention should prevent the accidental loss of eyeglasses when the eyeglasses could fall or be knocked from the head of the user. Further, if the eyeglasses are allowed to hang from the strap on the chain around the neck of the user, the eyeglass frames will be flexibly held against the chest of the user in a position that should prevent bending of the frame if pressure is applied against the frame forcing it against the chest of the user.

While certain preferred embodiments of the present invention have been specifically disclosed, it should be understood that the invention is not limited thereto as many variations will be readily apparent to those skilled in the art and the invention is to be given the broadest possible interpertation within the terms of the following claims.

I claim:

1. An adjustable headband means for securing eyeglasses to the head of an eyeglass user, said eyeglasses including a substantially rigid eyeglass frame having hinge means for attaching separate temple/ear piece members to said frame at each side thereof, said hinge means including a portion securely attached to said frame, said portion including an opening for receiving means for attaching said temple/ear piece members, said adjustable headband means being adapted to replace said temple/ear piece members for securing said eyeglass frame to the head of said eyeglass user, said adjustable headband means for securing said eyeglasses comprising:

a) flexible strap means, b) means comprising an integral part of said strap for movably attaching said strap means to said eyeglass frame at said portion of said hinge means at each side of said frame, c) a clamp means, d) said flexible strap means slideably passing through said clamp means, e) holding means in said clamp means cooperating with said flexible strap to secure said strap within said clamp, f) and means for preventing said flexible strap from being removed from said clamp, whereby said strap means when attached to said eyeglass frame by said integral part of said strap may be slideably passed around the head of the eyeglass user and through said clamp to tighten said eyeglass frame to the face of the user and said strap may then be secured to hold said eyeglasses against the head of the user.

2. The adjustable headband means of claim 1 wherein said flexible strap means is inextensible in its longitudinal direction and is flexible in lateral directions.

3. The adjustable headband means of claim 1 wherein said flexible strap is a pair of separate strap elements each separate strap having said integral part, one of said pair of straps attached by said integral part to each side of said eyeglass frame at said hinge portion.

4. The adjustable headband means of claim 1 wherein said integral part of said strap for attaching said strap means to said eyeglass frame is an attachment means passing through said hinge means and replacing said temple/ear piece members, said attachment means being universally movable with respect to said portion of said hinge means.

5. The adjustable head band means of claim 4 wherein said integral part of said strap for attaching said strap means to said eyeglass frame includes a resilient adjustable member adapted to engage said portion of said hinge means at said opening.

6. The adjustable head band means of claim 4 wherein said portion of said hinge means includes a pair of aligned hollow hinge loops and said resilient adjustable means includes fingers adapted to pass through said aligned hollow hinge loops, said fingers being adapted to be formed to maintain movable engagement with said hinge loops.

7. The adjustable head band means of claim 6 wherein said resilient adjustable means is a crimped resilient means attached to said strap so as to become an integral part of said strap.

8. The adjustable head band means of claim 6 wherein said resilient adjustable means is a resilient spring means including said fingers, said spring means being adapted to place said fingers in said hinge loops with said fingers biased by said spring means to releasably maintain said headband attached to said eyeglass frame.

9. The adjustable headband means of claim 1 wherein said clamp means comprises a locking means including means for passing said strap means side-by-side through said clamp means and a flexible means within said clamp for releasably holding said strap means in said clamp.

10. The adjustable headband means of claim 9 wherein said locking means in said clamp means is a flexible gromet member engaging each of said strap means and holding said strap means in said clamp.

11. The adjustable headband means of claim 1 wherein said flexible strap is a pair of separate strap elements, one of said pair of straps attached to each side of said eyeglass frame, said clamp means is a hollow Y-shaped means for accomodating said straps, said Y-shape permitting entry of one of said pair of said straps means from each side of said eyeglass frame into said Y-shape at the upper arms of said Y and exit of both strap means in a side-by-side relationship from the central leg of said Y, said holding means engaging said strap means at the junction of said arms and said leg of said Y-shape.

12. The adjustable headband means of claim 1 wherein said means for preventing said strap means from being removed from said clamp includes an enlarged portion that will not pass through said clamp at each end of said strap, said enlarged portion being at an end of said strap means not attached to said hinge means of said eyeglass frame so as to prevent said clamp from being removed from said strap means.

13. The adjustable headband means of claim 1 wherein said flexible strap means is a metallic box link chain.

14. The adjustable headband means of claim 1 wherein said means comprising an integral part of said strap for movably attaching strap means to said hinge means on said eyeglass frame is a spring clamp integrally attached to said strap means and having means passing through said portion of said hinge means.

15. The adjustable headband means of claim 1 wherein at least a portion off said flexible strap means between said clamp and said means for movably attaching said strap means to said eyeglasses frame is enclosed in an elongated tubular sheathing, said sheathing being adapted to protect the head of the eyeglasses user when said strap means holds said eyeglasses against the head of the user.

16. The adjustable headband means of claim 15 wherein said elongated tubular sheathing is movable along said strap means to be positioned against the head of the user.

17. The adjustable headband means of claim 15 wherein said elongated tubular sheathing is a material adapted to be heat shrunken about said strap means.

18. The adjustable headband means of claim 17 wherein said elongated tubular sheathing is a heat shrinkable plastic material.

* * * * *